Aug. 27, 1957     C. W. SINCLAIR ET AL     2,804,117
WHEEL RIM
Filed Aug. 13, 1956.     2 Sheets-Sheet 1
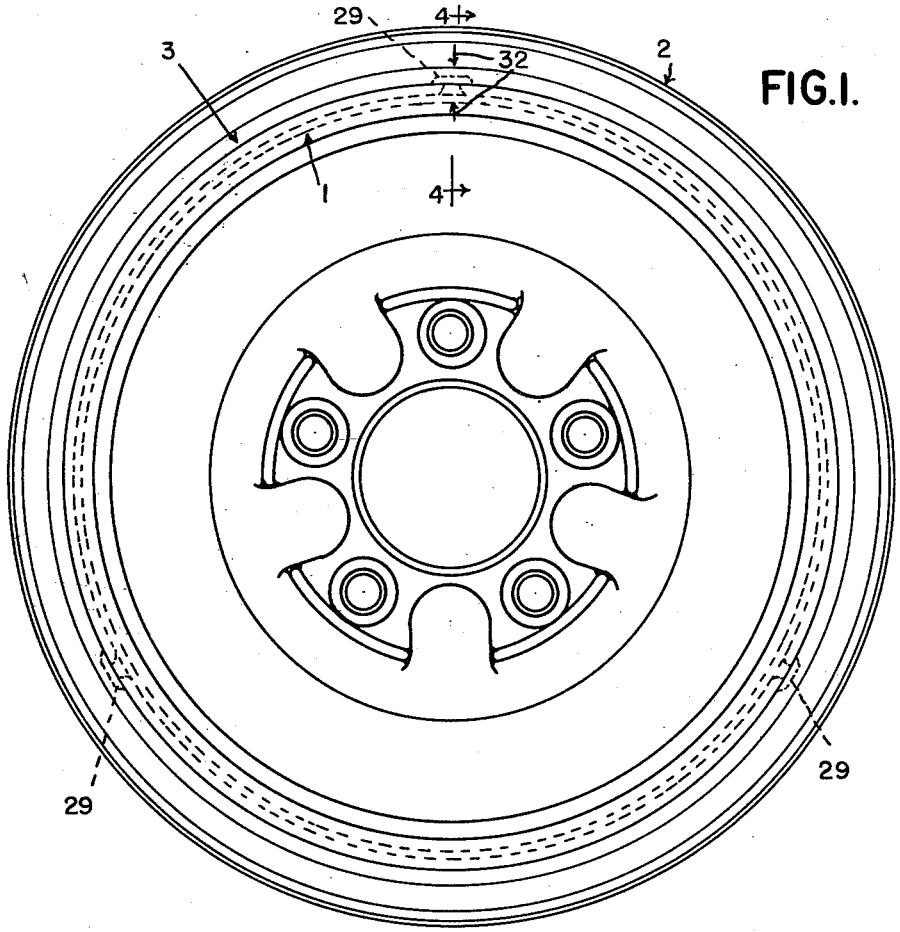
FIG.I.
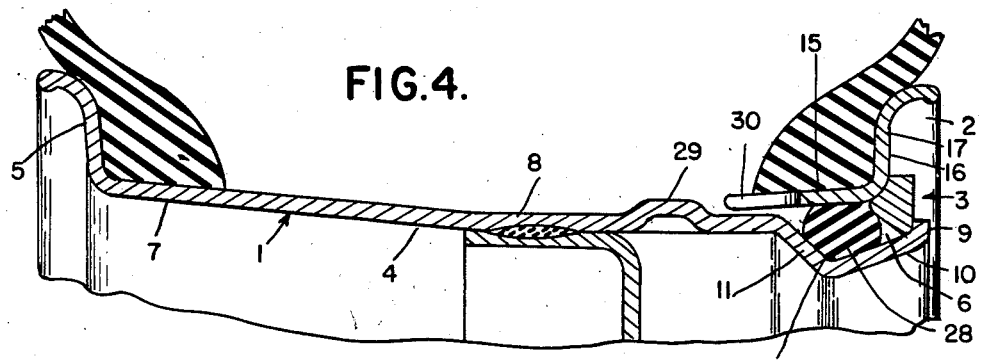
FIG.4.
INVENTORS
CHARLES W. SINCLAIR
BY RUPERT L. ATKIN
ATTORNEYS Aug. 27, 1957  C. W. SINCLAIR ET AL  2,804,117
WHEEL RIM
Filed Aug. 13, 1956  2 Sheets-Sheet 2
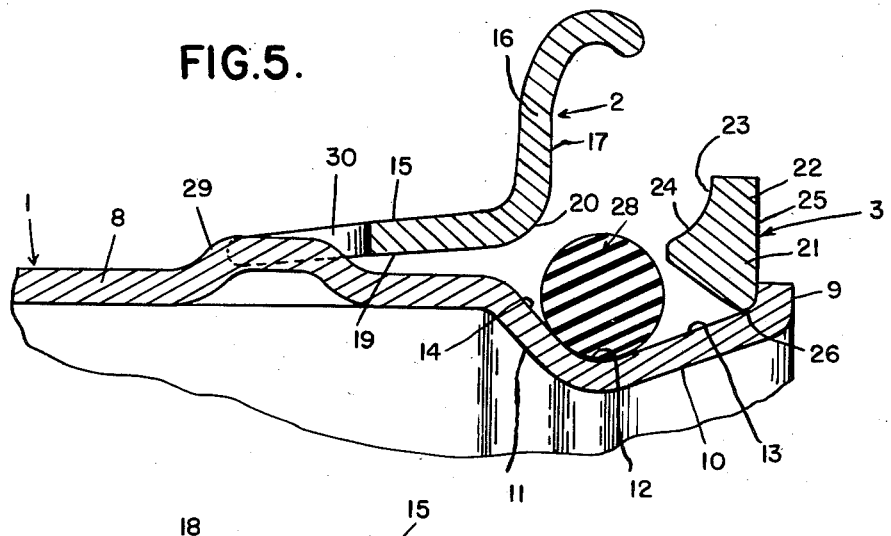
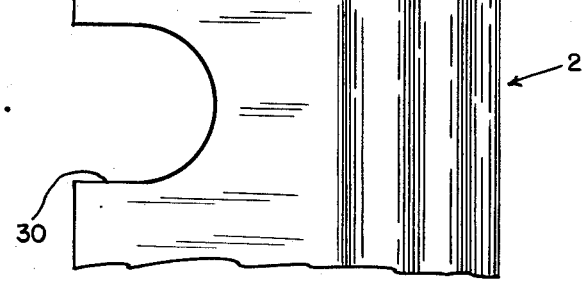
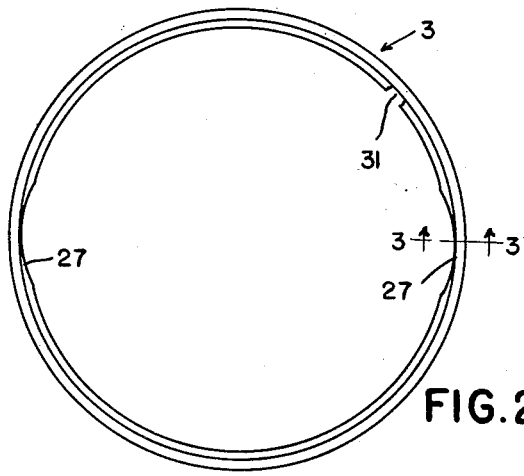
INVENTORS
CHARLES W. SINCLAIR
BY RUPERT L. ATKIN
ATTORNEYS

United States Patent Office 2,804,117
Patented Aug. 27, 1957

2,804,117

WHEEL RIM

Charles W. Sinclair, Detroit, and Rupert L. Atkin, Grosse Pointe Woods, Mich., assignors to Kelsey-Hayes Company, a corporation of Delaware Application August 13, 1956, Serial No. 603,513

6 Claims. (Cl. 152—409)

This invention relates to rims and refers more particularly to rims for pneumatic tubeless tires.

The invention has for an object to provide an improved rim constructed to facilitate mounting and demounting the tubeless tire and to maintain air pressure.

The invention has for other objects to provide an improved rim comprising an annular base member, an annular tire retaining member, a clamping member for positively limiting movement of the tire retaining member relative to the base member in an axially outward direction and a sealing member between the base member and tire retaining member for preventing the escape of air therebetween; and to provide means operative in one rotative position of the tire retaining member relative to the base member for positively limiting the tire retaining member against movement in an axially inward direction far enough to break the sealing contact between the tire retaining member and the sealing member, the tire retaining member in another rotative position being movable axially inwardly beyond the positive limit established by the limiting means a distance sufficient to enable assembling the clamping member and sealing member on the base member.

The invention has for still another object to provide an improved rim comprising an annular base member having a gutter at one edge, an annular tire retaining member encircling the base member, a clamping member within the gutter and abutting the terminal wall of the gutter and the tire retaining member to positively limit axially outward movement of the latter, a sealing member in the gutter at the axially inner side of the clamping member and circumferentially spaced abutments on the base member operative in one rotative position of the tire retaining member for engaging the axially inner edge of the tire bead seat portion of the tire retaining member to positively limit the latter against movement in an axially inward direction far enough to break the sealing contact between the sealing member and the tire retaining member, the axially inner edge of the tire bead seat portion being formed with circumferentially spaced notches registerable with the abutments in another rotative position of the tire retaining member to enable axially inward movement of the tire retaining member beyond the positive limit established by the abutments a distance sufficient to permit the insertion of the sealing member into the gutter between the clamping member and tire retaining member.

These and other objects of the invention will become apparent from the following description taken in connection with the accompanying drawings in which:

Fig. 1 is a side elevational view of a wheel and rim embodying the invention;

Fig. 2 is an elevational view of the clamping member;

Fig. 3 is a cross-section on the line 3—3 of Fig. 2;

Fig. 4 is a cross-section on the line 4—4 of Fig. 1;

Fig. 5 is an enlarged view of a portion of Fig. 4 showing the parts in another position.

Fig. 6 is an elevation of a portion of the tire retaining member.

The rim is designed for use with pneumatic tubeless tires and is adapted to form part of a motor vehicle wheel. In general, the rim comprises the annular base member 1, the detachable annular tire retaining member 2, and the detachable annular clamping member 3 for retaining the tire retaining member on the base member.

The base member is endless and has the annular base 4, the annular tire retaining flange 5 extending generally radially outwardly from one edge of the base and the annular gutter 6 at the other edge of the base. The base 4 is formed with the annular tire bead seat portion 7 flared toward and connecting into the tire retaining flange 5, and the axially extending annular portion 8 leading from the bead seat portion. The gutter 6 has the axially outer radially outwardly extending terminal wall 9 which has an external diameter preferably less than the external diameter of the annular portion 8, the axially and radially outwardly inclined bottom wall 10 connecting into the terminal wall 9, and the radially outwardly and axially inwardly inclined wall 11 which connects into the axially extending portion 8. The gutter 6 has an annular radially outwardly facing well 12 formed by reason of the bottom wall 10 being inclined radially and axially outwardly, and the well is defined by the radially and axially outwardly inclined radially outer surface 13 of the bottom wall and the radially outwardly and axially inwardly inclined radially outer surface 14 of the inclined wall 11.

The detachable annular tire retaining member 2 is endless and is movable over the terminal wall 9. The tire retaining member has the tire bead seat portion 15 and the integral tire retaining flange 16 extending generally radially outwardly from the axially outer edge of the tire bead seat portion and provided with a substantially radial axially outer surface 17. The tire bead seat portion 15 is inclined axially and radially outwardly at an angle less than the bottom wall 10 and the axially inner edge 18 of the tire bead seat portion is of a slightly greater diameter than the external diameter of the annular portion 8 to clear the latter. The radially inner surface 19 of the tire bead seat portion 15 is inclined axially and radially outwardly at an angle less than the radially outer surface 13 of the bottom wall of the gutter. The radially inner surface 19 is connected to the axially outer surface 17 by a rounded convex surface 20.

The detachable annular clamping member is endless and is formed of a resilient metal having a body portion 21 and a flange portion 22. The flange portion 22 has a substantially radially extending axially inner surface 23 and the body portion 21 has a concave rounded surface 24 connecting into the axially inner surface 23 of the flange portion and having the same curvature as the rounded surface 20, and a radially extending axially outer surface 25 connecting into a radially inner surface 26 inclined radially and axially outwardly at the same angle as the surface 13 of the bottom wall 10. In the final or completely assembled position of the rim members, the body portion 21 extends between the gutter 6 and the tire retaining member 2 and centers the tire retaining member 2 relative to the base member 1, the radially inner surface 26 engaging the surface 13 of the bottom wall 10 of the gutter, the axially outer surface 25 engaging the radially extending axially inner surface of the terminal wall 9 and the concave surface 24 engaging the convex surface 20. The axially inner surface 23 of the clamping member engages the axially outer surface 17 of the tire retaining member. The minimum and maximum distances between the surfaces 24 and 26 of the clamping member are normally greater before assembly of the rim members than the minimum and maximum distances respectively between the convex surface 20 and the portion of the surface 13 of the bottom wall 10 engaged by surface 26. Therefore, during assembly of the base, tire retaining and clamping members, the clamping member has wedging engagement with the tire retaining member and is contracted against the bottom wall of the gutter and flexes either or both the base and tire retaining members. The clamping member 3 has diametrically opposite clearances 27 in its radially inner edge. The inside diameter of the clamping member is slightly greater than the distance from the bottom of the well 12 to the radially outer edge of the terminal wall 9 at the diametrically opposite side of the rim.

The beads of the tubeless tire firmly engage the tire bead seat portions 7 and 15 to prevent the escape of air along these tire bead seat portions.

To seal the gap between the base member 1 and the tire retaining member 2, we have provided the annular sealing member 28 in the annular space formed by the gutter 6, the tire retaining member 2 and the clamping member 3. The sealing member is an endless resilient stretchable strip of deformable material, such as rubber, and preferably but not necessarily being of circular cross-section. Before the tire is inflated, the tire retaining member 2 assumes a position axially inwardly from that shown in Fig. 4 in which its axially inner edge 18 engages the abutments 29 on the base member. Three abutments 29 are provided, and these abutments are in the form of radially outward projections formed in the axially extending portion 8 at 120 degree intervals in a common radial plane. With the tire retaining member in this position with its axially inner edge 18 engaging the abutments, the cross-sectional dimension of the sealing member is such that it is deformed and makes sealing contact with the surface 13 of the bottom wall 10 and the radially inner surface 19 of the tire bead seat portion and also is deformed and makes sealing contact with the surface 14 of wall 11, to prevent the escape of air while the tire is being inflated. In the final position of the rim members shown in Fig. 4, the sealing member is deformed and wedged more firmly between the surfaces 13 and 19 and forms a more effective seal for the gap between the base and tire retaining members, and also is deformed and makes sealing contact with the surface 14.

The axially inner edge of the tire bead seat portion is formed with three clearance notches 30 located at 120 degree intervals thereabout. These notches have a slightly greater width or circumferential dimension than the diameter of the abutments 29 to freely receive the abutments when the tire retaining member is rotated relative to the base member to a position in which the clearance notches register with the respective abutments 29. When the clearance notches 30 register with the abutments 29 the tire retaining member 2 may be moved axially inwardly a distance sufficient to permit the sealing member 28 to be inserted into the gutter between the clamping member and tire retaining member (see Fig. 5).

The tubeless tire may be readily mounted on the rim while the tire retaining member 2, the clamping member 3 and the sealing member 28 are removed. The tire retaining member may then be moved over the base member and inserted within the axially outer bead of the tubeless tire at which time the beads of the tubeless tire tightly fit the tire bead seat portions 7 and 15 of the base and tire retaining members respectively so that air cannot escape between the beads and bead seat portions. When the tire retaining member 2 is rotated to a position in which the notches register with the abutments and is moved axially inwardly to a position in which the notches receive the abutments, shown in Fig. 5, the clamping member 3 is buttoned on the base member in position in the gutter 6 by placing a portion of the clamping member between the clearances 27 in the well 12 at one side of the base member, and the clamping member is distorted to expand the diametrically opposite portion thereof over the radially outer edge of the terminal wall 9 at the diametrically opposite side of the base member. The clearances 27 facilitate buttoning on of the clamping member. When the clamping member is fully located within the gutter and abutting the terminal wall 9, and with the tire retaining member still in the position shown in Fig. 5, the sealing member 28 is expanded over the clamping member 3 and is positioned in the well of the gutter by inserting it through the space between the clamping member and tire retaining member. The tire retaining member 2 and the adjacent portion of the side wall of the tire may then be allowed to move axially outwardly or manually moved axially outwardly to a position in which the clearance notches 30 are withdrawn from the abutments and then the tire retaining member is rotated relative to the base member to a position in which the clearance notches are out of register with the abutments 29 to occupy a preliminary inflatable position at which time the sealing member is deformed into sealing engagement with the surfaces 13, 14 and 19 to seal the gap therebetween, the tire may then be inflated at which time the inflating air acting through the tire against the tire retaining member 2 assures engagement of the clamping member with the terminal wall of the gutter and moves the tire retaining member to its axially outer position shown in Fig. 4. During this axially outward movement, the surface 19 of the tire retaining member acts upon the sealing member and tends to move it axially outwardly and to deform it into more firm sealing engagement with the surfaces 13 and 19 and also into firm sealing engagement with the clamping member 3. Moreover, the sealing member remains in sealing contact with the surface 14. Since the clamping member is endless rather than split, it will not pinch or otherwise damage the sealing member. The clamping member 3 has a notch 31 in its radially inner edge to facilitate its removal from the base member through insertion of a screw-driver, tire iron, or like instrument into prying engagement.

Even when a sharp turn is made at high speed, in which event there may be forces tending to move the tire retaining member axially inwardly, the abutments 29 will engage the axially inner edge of the bead seat portion of the tire retaining member to positively limit the tire retaining member against movement in an axially inward direction far enough to break the sealing contact between the sealing member and the tire bead seat portion. However, during mounting and demounting, the tire retaining member is rotated to a position in which the clearance notches 30 respectively register with the abutments 29 to clear the latter and thereby enable further axially inward movement of the tire retaining member sufficient to permit the clamping member to be buttoned on the base member and also to permit the insertion of the sealing member into the gutter between the clamping member and the tire retaining member.

The radially inner surface of the bottom wall 10 of the gutter and the surface 17 of the tire retaining member are marked with indicia in the form of an arrow on each, indicated at 32, which point toward one another and when in registration indicate that the clearance notches 30 are in register with the abutments 29.

What we claim as our invention is:

1. A rim for a tubeless tire comprising an annular base member having a gutter at one edge formed with a radially outwardly extending terminal wall and a bottom wall, a detachable annular tire retaining member movable over said terminal wall and encircling said base member and having a generally radially extending tire retaining flange and a tire bead seat portion, an endless clamping member in said gutter between said base and tire retaining members and abutting said terminal wall and tire retaining member to positively limit movement of said tire retaining member relative to said base member in an axially outward direction, an annular sealing member in said gutter making sealing contact with said tire bead seat portion and said bottom wall, means operative in one rotative position of said tire retaining member relative to said base member for positively limiting said tire retaining member against movement in an axially inward direction relative to said base member far enough to break the sealing contact between said tire bead seat portion and said sealing member, said tire retaining member in another rotative position relative to said base member being movable axially inwardly relative to said base member beyond the positive limit established by said limiting means a distance sufficient to enable the insertion of said sealing member into said gutter between said tire retaining member and said clamping member, said limiting means including circumferentially spaced abutments on said base member engageable with the axially inner edge of said tire bead seat portion, said tire bead seat portion having clearance notches in its radially inner edge registrable with said abutments in the said other rotative position of said tire retaining member relative to said base member.

2. A rim for a tubeless tire comprising an annular base member having a gutter at one edge formed with a radially outwardly extending terminal wall and a bottom wall, a detachable annular tire retaining member movable over said terminal wall and encircling said base member and having a generally radially extending tire retaining flange and a tire bead seat portion, a clamping member in said gutter between said base and tire retaining members and abutting said terminal wall and tire retaining member to positively limit movement of said tire retaining member relative to said base member in an axially outward direction, an annular sealing member in said gutter making sealing contact with said tire bead seat portion and said bottom wall, means operative in one rotative position of said tire retaining member relative to said base member for positively limiting said tire retaining member against movement in an axially inward direction relative to said base member far enough to break the sealing contact between said tire bead seat portion and said sealing member, said tire retaining member in another rotative position relative to said base member being movable axially inwardly relative to said base member beyond the positive limit established by said limiting means a distance sufficient to enable inserting said clamping member and sealing member in said gutter.

3. A rim for a tubeless tire comprising an annular base member having a gutter at one edge formed with a radially outwardly extending terminal wall and a bottom wall formed to provide a well, an annular tire retaining member movable over said base member and encircling said base member and having a generally radially extending tire retaining flange and a tire bead seat portion, an endless clamping member between said base member and tire retaining member and abutting said terminal wall and tire retaining member to positively limit movement of said tire retaining member relative to said base member in an axially outward direction, an endless sealing member in said gutter making sealing contact with said bottom wall and said tire retaining member, means operative in one rotative position of said tire retaining member relative to said base member for positively limiting said tire retaining member against movement in an axially inward direction relative to said base member far enough to break the sealing contact between said tire bead seat portion and said sealing member, said tire retaining member in another rotative position relative to said base member being movable axially inwardly relative to said base member beyond the positive limit established by said limiting means a distance sufficient to enable the insertion of said sealing member into said gutter between said tire retaining member and said clamping member.

4. A rim for a tubeless tire comprising an annular base member, a detachable annular tire retaining member encircling said base member adjacent on axially outer edge thereof, a clamping member on said base member adjacent said outer edge abutting said tire retaining member, an annular sealing member carried by said base member adjacent said outer edge and making sealing contact with said base member and said tire retaining member, means operative in one rotative position of said tire retaining member relative to said base member for positively limiting said tire retaining member against movement in an axially inward direction relative to said base member far enough to break the sealing contact between said tire retaining member and said sealing member, said tire retaining member in another rotative position relative to said base member being movable axially inwardly relative to said base member beyond the positive limit established by said limiting means a distance sufficient to enable assembling said clamping member and sealing member on said base member.

5. A rim for a tubeless tire comprising an annular base member having an annular gutter at one edge formed with a radially outwardly extending terminal wall and a bottom wall radially outwardly inclined toward said terminal wall, a detachable annular tire retaining member movable over said terminal wall and encircling said base member and having a generally radially outwardly extending tire retaining flange and a tire bead seat portion radially outwardly inclined toward said flange at an angle smaller than that made by said bottom wall, an endless clamping member extending within said gutter and abutting said terminal wall and tire retaining member, an endless deformable sealing member in said gutter at the axially inner side of said clamping member making sealing contact with said tire bead seat portion and said bottom wall, abutment means on said base member operative in one rotative position of said tire retaining member relative to said base member for engaging and positively limiting said tire retaining member against movement in an axially inward direction relative to said base member far enough to break the sealing contact between said sealing member and said tire bead seat portion, said tire retaining member being formed to clear said abutment means in another rotative position relative to said base member to enable axially inward movement of said tire retaining member beyond the positive limit established by said abutment means a distance sufficient to permit the insertion of said sealing member into said gutter between said clamping and tire retaining members.

6. A rim for a tubeless tire comprising an annular base member having an annular gutter at one edge formed with a radially outwardly extending terminal wall and a bottom wall radially outwardly inclined toward said terminal wall, a detachable annular tire retaining member movable over said terminal wall and encircling said base member and having a generally radially outwardly extending tire retaining flange and a tire bead seat portion radially outwardly inclined toward said flange at an angle smaller than that made by said bottom wall, an endless clamping member extending within said gutter and abutting said terminal wall and tire retaining member, said clamping member being resilient and having substantially diametrically opposite clearances at its radially inner edge to facilitate buttoning on of said clamping member, an endless resilient stretchable sealing member of deformable material in said gutter at the axially inner side of said clamping member making sealing contact with said tire bead seat portion and said bottom wall, circumferentially spaced abutments on said base member operative in one rotative position of said tire retaining member relative to said base member for engaging the axially inner edge of said tire bead seat portion to positively limit said tire retaining member against movement in an axially inward direction relative to said base member far enough to break the sealing contact between said sealing member and said tire bead seat portion, the axially inner edge of said tire bead seat portion being formed with circumferentially spaced notches registrable with said abutments in another rotative position of said tire retaining member to enable axially inward movement of said tire retaining member beyond the positive limit established by said abutments a distance sufficient to permit the insertion of said sealing member into said gutter between said clamping member and tire retaining member, and indicia on said base and tire retaining members to indicate when said base and tire retaining members are in the said other rotative position.

References Cited in the file of this patent

UNITED STATES PATENTS 969,779    Gammeter _____ Sept. 13, 1910

FOREIGN PATENTS 744,085    Great Britain _____ Feb. 1, 1956